(No Model.)

J. QUINN.
BELT GOVERNOR.

No. 592,827. Patented Nov. 2, 1897.

WITNESSES:
C. Nordfors
C. Gerst

INVENTOR
Joseph Quinn
BY
Edgar Tate & Co.
ATTORNEYS.

UNITED STATES PATENT OFFICE.

JOSEPH QUINN, OF BROOKLYN, NEW YORK.

BELT-GOVERNOR.

SPECIFICATION forming part of Letters Patent No. 592,827, dated November 2, 1897.

Application filed August 20, 1897. Serial No. 648,861. (No model.)

*To all whom it may concern:*

Be it known that I, JOSEPH QUINN, a citizen of the United States, residing at Brooklyn, in the county of Kings and State of New York, have invented certain new and useful Improvements in Belt-Governors for Power Apparatus, of which the following is a full and complete specification, such as will enable those skilled in the art to which it appertains to make and use the same.

This invention relates to belt-governors; and the object thereof is to provide an improved device of this class which is designed to prevent the interfering of belts which are mounted on the same power-wheel and which are adapted to be shifted from one driving-pulley to another, a further object being to provide a belt-governor which is designed to control the belts of elevator machinery where straight and cross belts are used for reverse motion, said governor being adapted to be attached to any suitable support and being designed to prevent the belts from interfering when they are shifted, and also to prevent said belts from being thrown from the pulleys in connection with which they operate.

The invention is fully disclosed in the following specification, of which the accompanying drawings form a part, in which—

Figure 1:
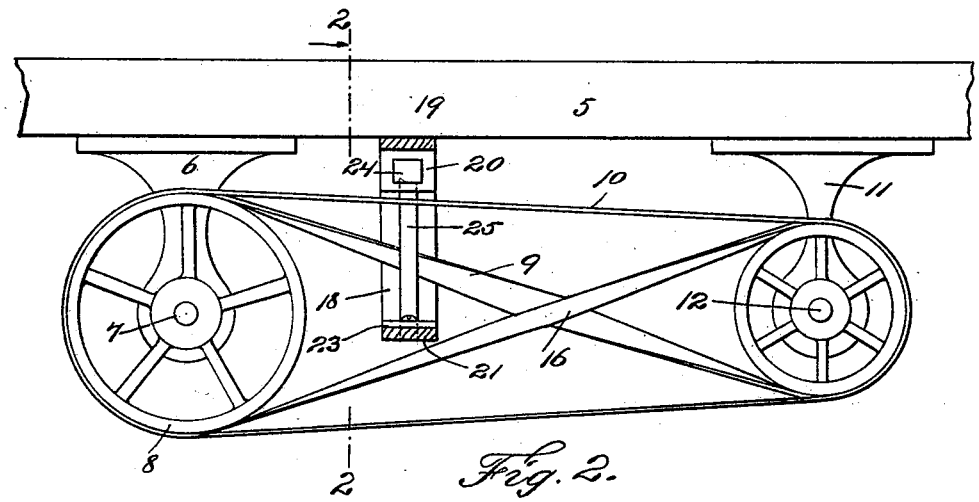
Figure 2:
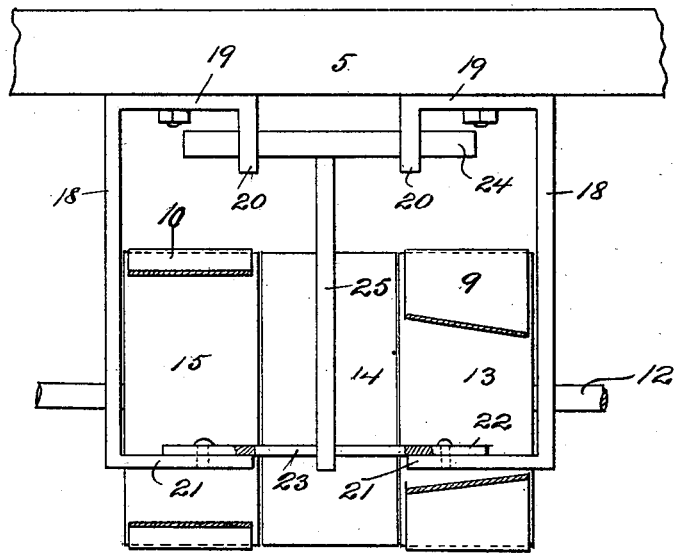

Figure 1 is a sectional side view of a power apparatus, showing my improvement; and Fig. 2, a section on the line 2 2 of Fig. 1, showing the parts on an enlarged scale.

In the drawings forming part of this specification the separate parts of my improvement are designated by the same numerals of reference in each of the views, and in said drawings I have shown at 5 a suitable support in which is suspended a hanger or hangers 6, in which is mounted a shaft 7, which is provided with a power-wheel 8, on the opposite ends of which are mounted belts 9 and 10. Other hangers 11 are also provided and suspended from the support 5, and the hangers 11 carry a shaft 12, on which are mounted three power-transmission pulleys 13, 14, and 15.

The middle pulley 14 is rigidly keyed to the shaft 12 and is adapted to operate said shaft, and said shaft is adapted to serve as a power-transmitting shaft by means of which the power is applied to the machine to be operated, and the pulleys 13 and 15 are loosely mounted on said shaft, and when the belts 9 and 10 are connected with the pulleys 13 and 15 the shaft 12 will not be operated, and either of said belts may be shifted to the central pulley 14, so as to operate the shaft 12 whenever desired, and the belt 9 is crossed at 16, so as to turn said shaft in a direction opposite to that in which the belt 10 will turn it.

I also suspend from the support 5 a frame consisting of vertical side bars 18, which are provided with inwardly-directed extensions 19 at their upper ends, on which are formed downwardly-directed arms 20, and the said side bars 18 are provided at their lower ends with inwardly-directed arms 21, which are connected by a horizontal plate or bar 22, in which is formed a central longitudinal slot 23, and mounted in the downwardly-directed arms 20 is a sliding bar 24, which is provided centrally with a depending rod or bar 25, which passes through the longitudinal slot 23 in the plate or bar 22.

It will be observed that the bar 24 is free to slide transversely of its supports, and the ends of the slot 23 in the plate or bar 22 limit the transverse movement of the rod or bar 25, and the operation will be readily understood from the foregoing description when taken in connection with the accompanying drawings and the following statement thereof.

Suppose the belt 9 is on the pulley 13 and the belt 10 on the pulley 15, and both belts are passed through the frame of the governor, consisting of the depending side bars 18 and their connected parts. Now if the belt 9 be thrown into action by shifting it onto the pulley 14 it will in this operation come in contact with the rod or bar 25 and move it over toward the belt 10, and the lower end of the rod will come in contact with the end of the slot 23 in the plate or bar 22, which will thus limit the movement of said rod or arm 25. Then if the belt 10 be put into action the belt 9 is first moved back to the pulley 13 and the belt 10 is shifted onto the pulley 14, and the rod 25 will be moved in the opposite direction.

It will be observed that the movement of the governor rod or bar 25 may be limited by the depending arms 20 or by the end of the slot 23 in the plate or bar 22, and if in the above operation the belt 9 should have lagged in moving from the pulley 14 to the pulley 13 the rod 25 would come in contact with said belt and would move it into its proper position and force it into line with the pulley 13, and said belt could not run off said pulley by reason of the fact that it would be controlled by the corresponding side bar 18 of the frame of the governor. It will also be apparent that both of the belts 9 and 10 will be controlled in the same manner, and that the rod or bar 25, taken in connection with the side bars 18 of the frame by which it is supported, constitutes a complete governing apparatus for regulating the movement of the belts and keeping them in proper position.

My improvement has no connection whatever with the means employed for shifting the belts, and any suitable device may be employed for this purpose, and it will thus be seen that I accomplish the object of my invention by means of a device which is simple in construction and operation, and which may be employed in connection with almost any kind of machinery driven by belts.

It will be observed that the governor consists of the bars 18, which are suspended from the support 5, together with the transversely-movable bar 24, and the rod or bar 25, connected therewith, and it will be apparent that changes in and modifications of the construction herein described may be made without departing from the spirit of my invention or sacrificing its advantages.

Having fully described my invention, I claim as new and desire to secure by Letters Patent—

1. In a power apparatus provided with a plurality of movable belts which are adapted to be shifted from one pulley to another, a governor consisting of a frame, the sides of which inclose said belts, and a transversely-movable rod or bar which projects between said belts, substantially as shown and described.

2. In a power apparatus, a suitably-supported power-shaft, a power wheel or pulley mounted thereon, a power-transmitting shaft, three pulleys mounted thereon, the central pulley being rigidly secured to said power-transmitting shaft, and the others being adapted to revolve thereon, two belts connected with said power wheel or pulley and adapted to be connected with either of the pulleys on the power-transmitting shaft, and a governor consisting of side bars which inclose said belts, and a transversely-movable rod or bar which projects downwardly between said belts, substantially as shown and described.

3. A power apparatus consisting of a shaft, a power wheel or pulley mounted thereon, a suitably-supported power-transmitting shaft, three pulleys mounted thereon, the central one of which is rigidly keyed thereto, and two belts mounted on said power wheel or pulley and adapted to be connected with the pulleys on the power-transmitting shaft, and a governor suitably supported provided with side bars which inclose said belts and a transversely-movable rod or bar which projects between said belts, substantially as shown and described.

In testimony that I claim the foregoing as my invention I have signed my name, in presence of the subscribing witnesses, this 16th day of August, 1897.

JOSEPH QUINN.

Witnesses:
WM. F. MCGOWAN,
EMIL NEIBERT.